United States Patent [19]

Biglione et al.

[11] Patent Number: 4,814,374

[45] Date of Patent: Mar. 21, 1989

[54] POLYMERIC BLENDS BASED ON VINYL-AROMATIC POLYMERS ENDOWED WITH HIGH TENACITY AND CHEMICAL RESISTANCE

[75] Inventors: Gianfranco Biglione, Mantova; Andrea Mattiussi, Bollate; Giorgio Vittadini, Milan, all of Italy

[73] Assignee: Montedipe S.p.A., Milan, Italy

[21] Appl. No.: 147,122

[22] Filed: Jan. 21, 1988

Related U.S. Application Data

[63] Continuation of Ser. No. 863,786, May 16, 1986, abandoned.

[30] Foreign Application Priority Data

May 17, 1985 [IT] Italy ................................ 20779 A/85

[51] Int. Cl.[4] ...................... C08L 51/04; C08L 55/02; C08L 27/06
[52] U.S. Cl. ...................................... 524/504; 525/70; 525/84; 525/233; 525/235; 525/86
[58] Field of Search ..................... 525/70, 86, 84, 235; 524/504

[56] References Cited

U.S. PATENT DOCUMENTS 2,802,809  8/1957  Hayes ...................................... 525/74
3,053,800  9/1962  Grabowski et al. ................... 525/70
3,689,598  9/1972  Bierwirth et al. .............. 260/876 R

FOREIGN PATENT DOCUMENTS 739758  3/1970  Belgium .............................. 525/227

*Primary Examiner*—Carmen J. Seccuro
*Attorney, Agent, or Firm*—Stevens, Davis, Miller & Mosher

[57] ABSTRACT

Polymeric blends based on vinyl-aromatic polymers endowed with high tenacity and chemical resistance comprising:
  from 10 to 90% by weight of a vinyl-chloride polymer;
  from 90 to 10% by weight of a vinyl-aromatic copolymer containing from 2 to 25% by weight of an ethylenically unsaturated nitrile and a quantity not exceeding 15% by weight of a rubber, are disclosed.

8 Claims, No Drawings

POLYMERIC BLENDS BASED ON VINYL-AROMATIC POLYMERS ENDOWED WITH HIGH TENACITY AND CHEMICAL RESISTANCE

This application is a continuation of application Ser. No. 863,786, filed May 16, 1986, now abandoned.

The present invention relates to polymeric blends based on vinyl-aromatic polymers showing high tenacity and chemical resistance.

More particularly, the present invention relates to blends based on vinyl-aromatic polymers having high tenacity and chemical resistance suitable to be transformed into shaped bodies endowed with self-extinguishing and good physical properties.

As is known, vinyl-aromatic polymers are thermoplastic resins which can be transformed, under heating, into shaped bodies by injection or extrusion molding. Said vinyl-aromatic polymers have a fair tenacity, but they are not suitable for use in applications where a high tenacity associated with a good chemical resistance are required.

A way to improve these lacking properties is to provide a blend with other polymers having the necessary properties to give a material showing the desired combination of properties. However, this approach has been successful only in a limited number of cases. In fact, the blending results in combining the worst characteristics of each component, the result being a material of such poor properties as not to be of any practical or commercial value.

The reasons for this failure are due to the fact that not all polymers are compatible with each other and, therefore, do not perfectly adhere. As a result, interfaces are formed among the components of the blend, which represent weakness and breaking points.

We have now found that tenacity and chemical resistance of vinyl-aromatic polymers can be improved, without modifying substantially the other mechanical properties, by intimately mixing a vinylchloride polymer with a modified vinyl-aromatic copolymer containing copolymerized from 2 to 25% by weight of an ethylenically unsaturated nitrile and containing a quantity of rubber not exceeding 15% by weight.

The ratios between the two components of the blend may vary within a wide range and generally are comprised between:

from 10 to 90% by weight of a vinylchloride polymer;

from 90 to 10% by weight of a vinyl-aromatic copolymer containing copolymerized from 2 to 25% by weight of an ethylenically unsaturated nitrile and containing a quantity of rubber not exceeding 15% by weight.

Preferably, the blends contain from about 25% to about 75% by weight of a vinylchloride polymer and from about 25% to about 75% by weight of a vinyl-aromatic copolymer containing copolymerized an ethylenically unsaturated nitrile and a quantity not exceeding 15% by weight of rubber.

The term "vinyl-aromatic copolymer" as used in the present invention and claims is to be understood to include any solid thermoplastic polymer and respective copolymer essentially consisting of, i.e., containing chemically bound, at least 50% by weight of one or more vinyl-aromatic compounds of general formula:

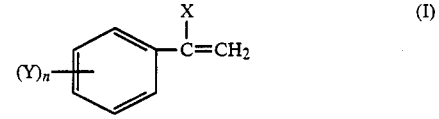

wherein X represents hydrogen or an alkyl radical having from 1 to 4 carbon atoms; n is zero or an integer from 1 to 5 and Y represents halogen or an alkyl radical having from 1 to 4 carbon atoms.

Examples of vinyl-aromatic compounds having general formula (I) are: styrene, methyl-styrene, mono-, di-, tri-, tetra- and penta-chlorostyrene and the respective alpha-methyl-styrenes, styrenes alkylated in the nucleus and the respective alpha-methyl-styrenes such as ortho- and para-methyl-styrenes, ortho- and para-ethyl-styrenes; ortho- and para-methyl-alpha-methyl-styrenes, etc.

These monomers may be used either alone or in admixture with other copolymerizable co-monomers such as, for instance, maleic anhydride.

Rubbers are used for making the vinyl-aromatic polymers impact or shock resistant and, according to the present invention, they are present in a quantity not exceeding 15% by weight. Quantities comprised between 2% and 12% by weight are preferred.

The rubbers which are used to this purpose are: polybutadiene, poly-isoprene, copolymers of butadiene and/or isoprene with styrene or with other monomers, or the saturated rubbers such as ethylene-propylene rubber, ethylene-propylene-diene terpolymers and silicon rubbers containing unsaturated groups, etc.

As ethylenically unsaturated nitrile copolymerized with vinyl-aromatic monomers is to be understood, firstly and preferably, acrylonitrile. Other ethylenically unsaturated monomers, such as methacrylonitrile, can be advantageously used.

The modified vinyl-aromatic copolymers can be obtained according to any known polymerization process, such as suspension, bulk-suspension or continuous bulk polymerization, provided that the above mentioned compounds are used as starting monomers.

Said modified vinyl-aromatic copolymers differ from the known acrylonitrile-butadiene-styrene resins, known as ABS resins as far as the morphology, structure and size of the rubber particles dispersed in the rigid polymeric matrix are concerned. As a consequence of such morphological difference, the blends of the present invention display a resilience or impact resistance higher than that of the ABS resins, especially when the content in rubber is lower than 15% and preferably lower than 10% by weight.

Vinylchloride polymers to be used in the blends of the present invention may be either the vinylchloride homopolymer or copolymers thereof containing low amounts of other copolymerizable ethylenically unsaturated compounds.

Although vinylchloride homopolymers are preferred in the presently preferred embodiment of the invention, vinylchloride copolymers containing up to 20% by weight of other copolymerizable unsaturated compounds can be used, also. Suitable copolymerizable unsaturated compounds are, for instance, vinylidene chloride, vinylidene bromide, vinylidene fluorochloride and the like. Unsaturated hydrocarbons such as ethylene, propylene, isobutene; allyl compounds such as allylacetate, allylchloride, allyl-ethyl-ether; vinyl esters such as vinylacetate, vinylpropionate; acrylic or methacrylic acid and their esters containing from 1 to 8 carbon atoms in the alkyl group, acrylonitrile, etc., are contemplated.

Instead of a single unsaturated monomer of the above-described type, mixtures of said comonomers can be used, provided that these comonomers are not used in amounts exceeding 20% and do not substantially modify the properties of polyvinylchloride.

The blends of the present invention may be prepared by mixing them at low or high temperature in any known type of mixer. For instance, quick mixers (Henschel type), single-screw or double-screw extruders, Banbury mixers, mixing rollers, etc., may be used. If the blend is prepared at high temperature, temperatures comprised between 140° and 200° C. can be used to obtain a homogeneous and uniform composition.

The compositions may comprise small amounts, generally comprised between 1 and 5% by weight, of a stabilizer or other additives intimately mixed. Suitable stabilizers are lead basic carbonate, lead dibasic stearate, lead tribasic phosphate, lead dibasic phosphate, cadmium stearate, cadmium laurate, cadmium ricinolate, glyceryl-monostearate, dibutyl-tin-mercaptide and oragno-tin-compounds containing sulfur such as, for instance, dibutyl-tin-S,S'-bis(3,5,5-trimethylhexylmercaptoacetate).

Other conventional additives such as plasticizers, lubricants, anti-flame agents, flowing agents, anti-static agents, dyestuffs, pigments, foaming agents to provide lighter bodies and semi-finished products may be added during the mixing step of the components, in quantities ranging from 0.1 to 10% by weight.

The blends of the present invention can be easily processed and show a set of properties which, on the whole, are better than those of the single components. For this reason, the polymeric blends of the present invention find useful application for obtaining material endowed with high tenacity combined with high chemical and flame-resistance up to being self-extinguishing. Therefore, said blends are used in the field of domestic electrical apparatus and appliances, electronics and generally in the field of technical materials in the form of films, sheets, tapes, bands, rods, boxes, cups, containers, etc. The blends may be used to provide foamed articles by the techniques known in the art.

The invention will be further described with reference to the following illustrative but not limiting examples.

In the examples, all the parts are expressed by weight unless indicated otherwise.

EXAMPLES 1-4

By means of a quick Henschel mixer there was prepared a blend having the following composition:

|  | By Weight |
| --- | --- |
| Polyvinylchloride K 58 | 100 |
| Lead tribasic sulfate | 3 |
| Lead dibasic phosphate | 1.5 |
| Lead dibasic stearate | 0.5 |
| Glyceryl monostearate | 1 |
| Wax E | 0.7 |
| Epoxidized soybean oil (Drapex 3.2) | 8 |

The thus obtained blend is mixed in the cold in a tumbler with: A vinyl-aromatic copolymer having the following composition: 72% styrene, 12% alpha-methylstyrene, 8% acrylonitrile and 8% polybutadiene rubber:

|  | Quantity reported in the table |
| --- | --- |
| Irganox 1076 | 0.2 |
| Wax type 617 A | 0.2 |

The thus obtained blend is extruded by means of a single-screw extruder having a diameter of 60 mm, a length/diameter ratio of 25, a compression ratio 3:1 and temperatures at the hopper and head of 160°, 170°, 180°, 175° C.

To determine the properties, the granules are injection molded at a temperature of 190° C. on a NEGRI & BOSSI V-17-110FA injection molding press in order to obtain test pieces having sizes according to standard specifications.

The properties measured on the thus obtained test pieces are reported in the following table.

To measure the characteristics of the blends of the present invention, the following methods were used:

A. Mechanical properties. Tensile strength and elasticity modulus were measured according to ASTM-D 638; IZOD resilience with indent at 23° C., was measured according to ASTM D 256, on test pieces having a 3.2 mm thickness.

B. Thermal properties. Softening temperature Vicat B (5 kg in oil) was determined according to ISO 306.

C. Rheologic properties. Melt index was determined according to ASTM D 1238, at 220° C. and 10 kg.

D. Resistance to cracking under load was measured on test pieces of 2.1 mm thickness, shape and sizes of which are according to ASTM D 2552 (Environmental Stress Cracking). Test pieces have been obtained by press molding, at 180° C., pressure 160 kg/cm$^2$, for 6 minutes. Cooling rate was about 10° C./1'. Said test pieces underwent a tensile stress with constant load of 10 MPa (creep) in an olive oil/oleic acid 50:50 by weight mixture. Resistance to crack is measured and expressed as the time necessary to break the test piece.

E. Self-extinction is determined according to UL-94.

TABLE

| COMPOSITION | UNITS | EXAMPLES | | | |
| --- | --- | --- | --- | --- | --- |
|  |  | 1 | 2 | 3 | 4 |
| Vinyl polychloride |  | — | 25 | 50 | 75 |
| Vinyl-aromatic copolymer |  | 100 | 75 | 50 | 25 |
| A. Mechanical properties |  |  |  |  |  |
| Tensile strength: |  |  |  |  |  |
| yield point | MPa | 30 | 29 | 35 | 42 |
| ultimate tensile strength | MPa | 31 | 26 | 32 | 37 |
| ultimate elongation | % | 45 | 45 | 53 | 40 |
| modulus of elasticity | MPa | 1800 | 2150 | 2300 | 2500 |
| Resilience IZOD | J/m | 80 | 87 | 65 | 72 |
| B. Thermal properties Vicat B | °C. | 98 | 71 | 69 | 68 |
| C. Rheologic properties Melt Index | g/10' | 12 | 5 | 5.1 | 5.2 |
| D. Resistance to cracking | min. | 250 | 380 | 450 | 610 |
| E. Self-extinction (classification according to UL 94) |  | NC* | NC* | NC* | VO |

*NC = Unclassifiable

EXAMPLE 5

Example 1 is repeated by blending 30 parts by weight of polyvinylchloride K 58 and 70 parts by weight of a vinyl-aromatic copolymer having the following composition: 72% styrene, 20% acrylonitrile, 8% polybutadiene rubber.

The properties of the thus obtained blend are as follows:

|   |   | Units |   |
|---|---|---|---|
| A. | Mechanical properties | | |
|   | Tensile strength | | |
|   | yield point | MPa | 32 |
|   | ultimate tensile strength | MPa | 30 |
|   | ultimate elongation | % | 42 |
|   | modulus of elasticity | MPa | 2400 |
|   | resilience IZOD | J/m | 90 |
| B. | Thermal Properties | °C. | 70 |
|   | Vicat B | | |
| C. | Rheologic properties | g/10' | 4.0 |
|   | Melt index | | |
| D. | Resistance to cracking | min. | 470 |
| E. | Self-extinction (Classification according to UL 94) | | NC* |

*NC = unclassifiable

We claim:

1. Vinyl-aromatic polymeric blends having high tenacity and chemical resistance, characterized in that they comprise:
    from 10 to 90% by weight of a vinylchloride polymer and from 90 to 10% by weight of a diene rubber modified vinyl-aromatic copolymer containing from about 8% by weight of an ethylenically unsaturated nitrile and about 8% diene rubber by weight.

2. Blends according to claim 1, characterized in that they comprise from 25 to 75% by weight of a vinylchloride polymer and from 75 to 25% by weight of a diene rubber modified vinyl-aromatic copolymer containing from about 8% by weight of an ethylenically unsaturated nitrile and about 8% diene rubber by weight.

3. Blends according to claim 1, characterized in that the vinyl-aromatic copolymer contains at least 50% by weight of at least one vinyl-aromatic monomer of the general formula:

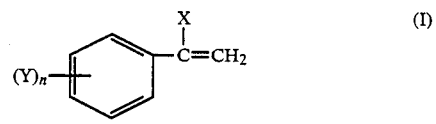

wherein X is selected from the group consisting of hydrogen and alkyl radicals having from 1 to 4 carbon atoms; Y is selected from the group consisting of halogen and alkyl radicals having from 1 to 4 carbon atoms, and n is an integer comprised between 0 and 5.

4. Blends according to claim 1, characterized in that the copolymerized ethylenically unsaturated nitrile is acrylonitrile.

5. Blends according to claim 1, characterized in that the copolymerized ethylenically unsaturated nitrile is methacrylonitrile.

6. Blends according to claim 1, characterized in that the vinylchloride polymers are selected from the group consisitng of vinylchloride homopolymer and copolymers thereof containing up to 20% by weight of other copolymerizable unsaturated compounds.

7. Blends according to claim 1, further characterized in that they contain from 0.1 to 10% by weight of an additive selected from the group consisting of stabilizers, plasticizers, lubricants, anti-flame agents, anti-static agents, flowing agents, dyestuffs, pigments, and foaming agents.

8. A blend according to claim 7, in which the additive is a stabilizer in the amount of 1 to 5% by weight.

* * * * *